PULSE DISCRIMINATING CIRCUITS

Filed Dec. 30, 1948 2 Sheets-Sheet 1

Inventor:
Robert E. Moe,
by Merton D. Moore
His Attorney.

PULSE DISCRIMINATING CIRCUITS

Filed Dec. 30, 1948 2 Sheets-Sheet 2

Inventor:
Robert E. Moe,
by Merton D. Morse
His Attorney.

Patented Nov. 7, 1950 2,529,172

UNITED STATES PATENT OFFICE 2,529,172

PULSE DISCRIMINATING CIRCUITS

Robert E. Moe, Syracuse, N. Y., assignor to General Electric Company, a corporation of New York Application December 30, 1948, Serial No. 68,364

5 Claims. (Cl. 178—7.3)

The present invention relates to circuits for discriminating between pulses of different waveform and has particular but not exclusive reference to television systems wherein it is desired to distinguish between pulses of the same amplitude but of different time duration.

In television receiver apparatus in which a televised picture is recreated on the fluorescent screen of a cathode ray tube, it is necessary to reproduce a raster similar to that utilized at the transmitting station in scanning the image transmitted. The raster is reproduced by reflecting the electron beam of the cathode ray tube by means of sweep circuits, synchronizing pulses being used to control these circuits. Commonly, two types of synchronizing pulses are employed, line or horizontal synchronizing pulses serving to control the line deflection of the sweep circuit, and frame or vertical synchronizing pulses serving to control the line-sequence deflection. Both types of pulses are commonly transmitted together on the same carrier wave and differ only in their time-durations. In order that they may be brought to act separately on the deflecting circuits associated with them, they must be separated or sorted out from a composite signal, and my invention relates particularly to an improved circuit for accomplishing this operation.

It is an object of my invention to provide an improved circuit for discriminating between pulses of different waveform.

Another object of my invention is to provide an improved circuit for separating pulses of a predetermined time-duration from a mixture of pulses of different time-durations.

Still a further object of my invention is to provide a circuit for use in a television receiver for giving a single sharp voltage impulse during the occurrence of frame or vertical synchronizing pulses of a predetermined time-duration which are supplied to the circuit, along with line or horizontal synchronizing pulses of shorter time duration.

For further objects and advantages and for a better understanding of the invention, attention is now directed to the following description and accompanying drawings and also to the appended claims in which the features of the invention believed to be novel are particularly pointed out.

In accordance with my invention, the transient oscillations resulting from the application of a steep wave front to a damped oscillatory circuit are utilized, in conjunction with the time intervals between wave fronts, to differentiate between pulses of different time-durations.

Figure 1:
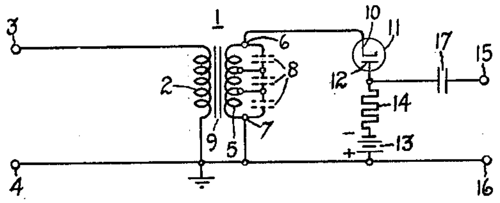
Fig. 1 is a circuit diagram illustrating certain principles of operation of my invention.

Referring to Fig. 1, there is shown a simple circuit for utilizing transient oscillations produced in a transformer for this purpose. The circuit comprises a transformer 1 having a primary winding 2, with input terminals 3 and 4, and a secondary winding 5, with output terminals 6 and 7. Input terminals 3 and 4 are adapted to be supplied with voltages of various waveforms to be described subsequently, terminal 4 being grounded. Winding 5 has a certain distributed capacitance represented by capacitors 8 in dashed outline. The transformer is provided with a core 9 of a suitable low hysteresis material such as iron powder in a resin binder.

Terminal 7 of the secondary winding is grounded, and terminal 6 thereof is connected to the cathode 10 of a diode discharge device 11. The anode 12 of device 11 is connected to the negative pole of a battery 13 through a resistor 14. The positive pole of the battery is connected to ground. A pair of output terminals 15 and 16 are connected respectively to anode 8 by a capacitor 17, and to ground.

As is well known, when a steep wave front is applied to the primary winding of a transformer, a transient oscillation is produced in the secondary circuit which decreases at a rate dependent on the losses in the circuit. The period of the oscillations induced depends in part on the distributed capacitance of the transformer, and may be varied by suitable design or by connecting capacitances in parallel with either the primary or the secondary circuit. The rate of decay or the duration of the oscillations may be controlled by suitable design of the windings and of the core, or by connecting resistance in parallel with either the primary or the secondary windings.

Figure 2:
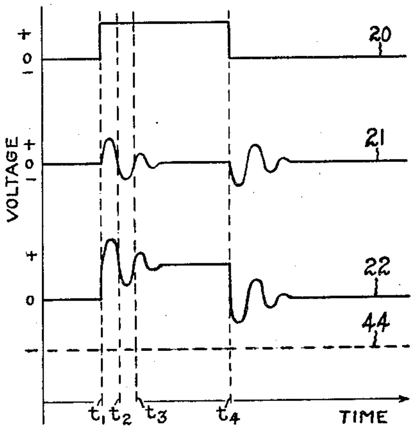
Figs. 2, 3 and 4 show, on a common time scale, certain waveforms illustrating the operation of the embodiment of Fig. 1.

For explanatory purposes, let it be assumed that a rectangular pulse of voltage, such as illustrated by curve 20 of Fig. 2 is applied to the input terminal 3 in the circuit of Fig. 1. At time $t_1$, the voltage applied to terminal 3 increases almost instantaneously to a certain finite value and remains at that value until a time $t_4$ when it returns practically instantaneously to the original zero value. The leading edge of the rectangular pulse occurring at time $t_4$ shock-excites the transformer into oscillation and a voltage is produced across the terminals of the secondary winding 5 whose transient component is illustrated by curve 21. The positive rise of voltage in the input pulse at time $t_1$ causes an initial positive surge of voltage in the secondary winding. This positive surge is followed by an oscillation which is quickly damped out in a few cycles. At the trailing edge of the rectangular pulse, the initial surge of voltage in the secondary winding is negative and again causes an oscillation which is rapidly damped out. In the circuit of Fig. 1, the low frequency response of the transformer is adequate to pass the low frequency component of the rectangular wave, up to the frequency represented by the transient period. Accordingly, the voltage developed between terminal 6 of the secondary winding and ground is the sum of the rectangular input pulse and the damped oscillations produced in the secondary winding. This is illustrated by curve 22 of Fig. 2, in which the rectangular pulse is generated in each case with the leading and trailing edges followed by the damped oscillations illustrated by curve 21.

The rectangular pulse which has been considered in Fig. 2 has a time-duration considerably longer than the period of the oscillations induced in the secondary circuit. Thus, referring to Fig. 2, the period of the transient excited in the secondary circuit is the time interval $t_1$—$t_3$ and the half period is the interval $t_1$—$t_2$. The duration of the rectangular pulse on the other hand is the interval $t_1$—$t_4$ which is considerably longer than the half period of the transformer.

Figure 3:
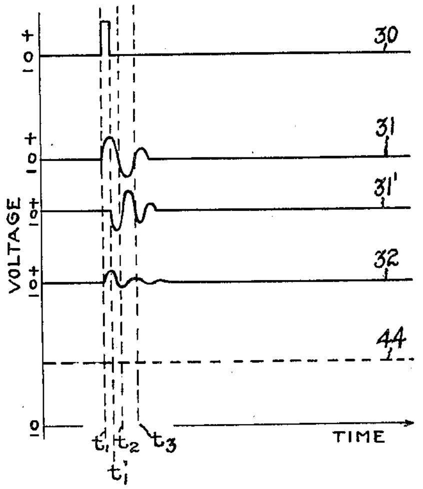

If now the time-duration of the rectangular pulse is made considerably shorter than the half period of the transformer, different results are obtained. Referring to Fig. 3, there is shown a curve 30 illustrating a rectangular pulse of short time-duration $t_1$—$t'_1$. When this pulse is applied to terminal 3 of the transformer, the initial and final transients practically coincide and almost cancel as illustrated by curve 31 and 31'. This oscillation is rapidly damped out and does not attain the same maximum voltage as attained in the oscillations of curve 21 because the duration of the pulse is too short to appreciably affect the condition of the transformer, with the result shown in curve 32.

Figure 4:
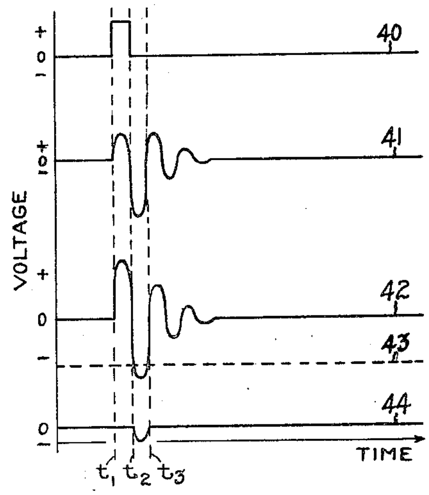

If now a rectangular pulse is applied to the input terminals 3 and 4, having a time duration equal to one half the period of transient oscillation of the transformer, totally different results are obtained. Referring to Fig. 4, curve 40 illustrates a single rectangular pulse of time duration $t_1$—$t_2$. The leading edge of the pulse occurring at time $t_1$ initiates an oscillation component in the secondary winding as illustrated by curve 41. The first positive cycle of the oscillation occurring between times $t_1$ and $t_2$ is identical to that illustrated by curve 21 of Fig. 2 between the same times. At time $t_2$, however, the trailing edge of the pulse occurs and now coincides with the negative half cycle of the damped oscillation. This further increases the amplitude of the oscillation and creates a negative half cycle having an amplitude substantially equal to the sum of the first half cycle and the second half cycle, both occurring in the same direction. Thereafter the oscillation decays at the same rate as in the previous examples. Curve 42 illustrates the resultant voltage occurring betwen terminal 15 and ground due to the addition of the voltages illustrated by curves 40 and 41.

Diode 11 operates as a biased detector and due to the negative potential applied to its anode by battery 13, no current flows through the diode until a voltage of sufficient negative polarity is applied to its cathode. When a voltage of sufficient negative amplitude to exceed this bias occurs at the cathode, current flows and a negative voltage is developed across resistor 14. This voltage is coupled to the output terminal 15 by capacitor 17. The broken line 43 in Fig. 4 illustrates the bias at the anode of diode 11 which must be exceeded before current flows to produce an output voltage at terminals 15 and 16. The output voltage produced is illustrated by curve 44 of Fig. 4 and consists of a single negative pulse occurring between times $t_2$ and $t_3$. Line 43 has also been reproduced in Figs. 2 and 3 to illustrate that the negative voltages occasioned when the time duration of the pulse is either longer or shorter than the half period of the transformer are not sufficient to overcome the bias on diode 11. Accordingly, an output voltage occurs only when the time duration of the pulse is substantially equal to the half period of the transformer as illustrated in Fig. 4.

Figure 5:
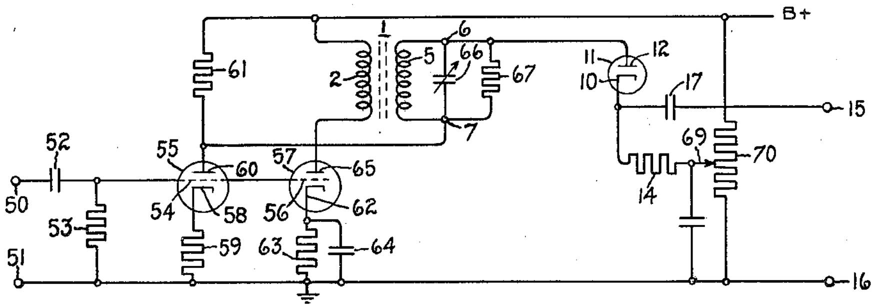
Fig. 5 is a circuit diagram of a preferred embodiment of my invention suitable for use in a television system.

Referring to Fig. 5, I have shown a preferred embodiment of my invention suitable for use in a television receiver circuit for distinguishing between line and frame synchronizing pulses. A pair of input terminals 50 and 51, adapted to be supplied with synchronizing pulses, are connected through a differentiating circuit comprising capacitor 52, and resistor 53, to the control electrode or grid 54 of an electron discharge device 55 and also to the control electrode or grid 56 of an electron discharge device 57. Device 55 has a cathode 58 connected to ground through a resistor 59, and an anode 60 connected, through a resistor 61, to a source of operating potential indicated by B+. Device 57 has a cathode 62 connected to ground through a resistor 63 in parallel with a by-pass capacitor 64, and an anode 65 connected to the source of operating potential B+ through the primary winding 2 of transformer 1. The secondary winding 5 of transformer 1 has a variable capacitor 66 and a resistor 67 connected across its terminals 6 and 7. Capacitor 66 is adjusted so that the period of the transient response of the transformer is equal to one and one third times the time-duration of the frame synchronizing pulses to be described subsequently. Stated in another way, the time-duration of the frame synchronizing pulses is equal to three-quarters of the period of the transient oscillations. Terminal 7 of the secondary winding is connected to the anode 60 of device 55, and terminal 6 is connected to the anode 12 of diode discharge device 11. The cathode 10 of device 11 is connected, in series with resistor 14, to a source of positive potential provided by a tap 69 on a potentiometer 70 connected between the source of operating potential B+ and ground. The output voltage from the diode is available at terminal 15 connected to the cathode 10 through a coupling capacitor 17.

Figure 6:
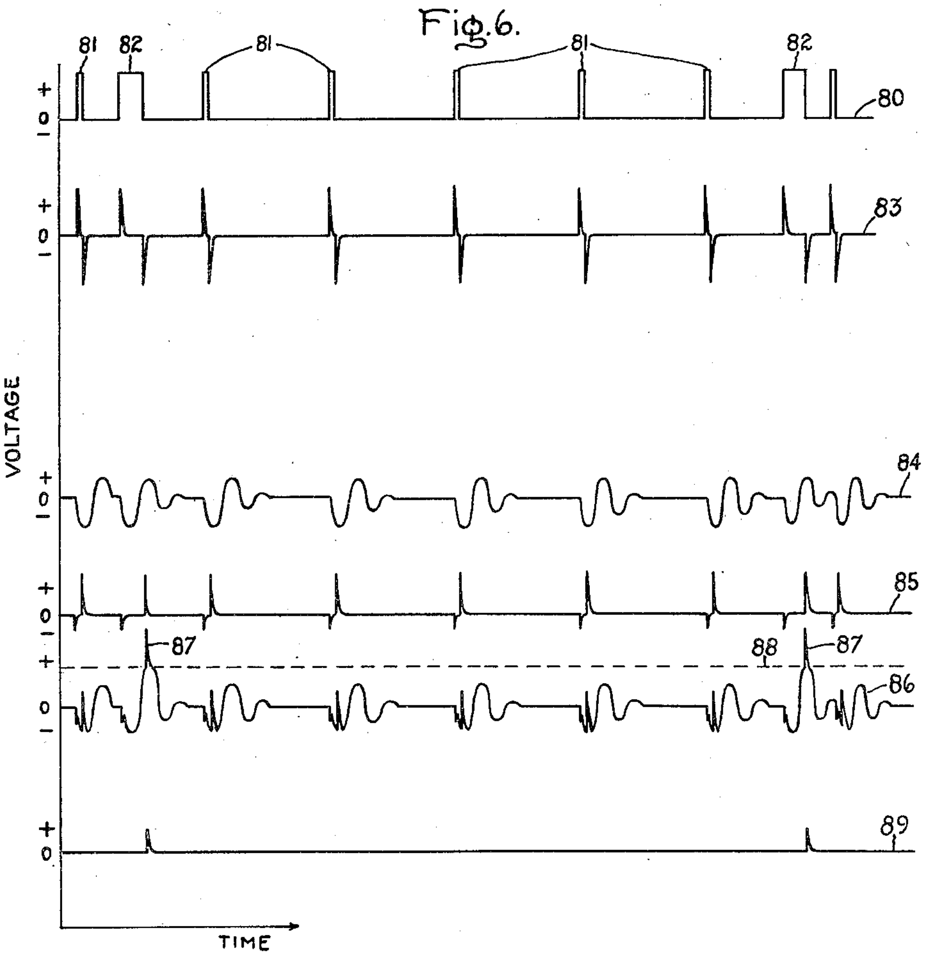
Fig. 6 shows, on a common time scale, waveforms of line and frame synchronizing pulses for a television system, and the resulting voltages produced at different points in the circuit of Fig. 5.

To illustrate the operation of the circuit, let it be assumed that a voltage, such as illustrated by curve 80 of Fig. 6, is applied to the input terminals 50 and 51. Curve 80 illustrates a series of narrow line synchronizing pulses 81 of short time-duration occurring at a relatively high repetition rate, with frame synchronizing pulses 82 of longer time-duration occurring at a lower repetition rate. Capacitor 52 and resistor 53 operate as a differentiating circuit, and provide, at the grid 54 of device 55, a voltage such as illustrated by curve 83 in which the leading edges of the pulses of curve 80 are replaced by positive peaks of voltage and in which the trailing edges are replaced by negative peaks of voltage.

Discharge device 57 is normally non-conductive due to the bias developed by cathode resistor 63. When a positive voltage, such as the positive peaks occurring in curve 83, is applied to the grid of device 57, current flows to the anode, and the secondary winding 5 sustains a transient oscillation as illustrated by curve 84. The transient oscillations are rapidly damped because of the loading of the secondary winding caused by resistor 67. By suitable adjustment of capacitor 66, the duration of the first three-quarters of a cycle of the transient oscillations is made to coincide with the duration of the frame synchronizing pulses 82. As for the negative peaks of voltage illustrated in curve 83, they have relatively little effect on device 57 because it is normally in a non-conductive state, due to the bias developed across resistor 63.

The positive peaks illustrated in curve 83 are, simultaneously with their application to the grid 56 of device 57, applied to the grid 54 of device 55. Device 55 is normally conducting and a positive voltage applied to its grid has only a small effect in comparison with a negative voltage of the same magnitude. Accordingly, device 55 provides a larger output voltage during the occurrence of the negative peaks of curve 83. The output voltage at the anode of device 55 is illustrated by curve 85 and consists of a series of small negative peaks each followed by a comparatively large positive peak.

The output voltage at the anode of device 55 is coupled to terminal 7 of the secondary winding 5 and, accordingly, the voltage developed between terminal 15 and ground is the result of the addition in series of the voltage induced in the secondary winding due to the positive peaks of voltage illustrated in curve 83, and the voltage developed at the anode of device 55, due to the negative peaks in curve 83. The resultant voltage is illustrated by curve 86 of Fig. 6. Due to the fact that the secondary winding 5 of transformer 1 in conjunction with capacitor 66 and resistor 67 has a three-quarter period of oscillation equal to the time duration of the frame synchronizing pulses 82, the positive peaks at the anode of device 55 occur at the same instant in time as the top of the first positive half cycle of the transient oscillation induced in the transformer winding 5. Accordingly, the total voltage developed between terminal 15 and ground is much higher than during the occurrence of the line synchronizing pulses, as illustrated by the sharp peak voltages 87.

Diode 11 and its associated circuit, comprising potentiometer 70 and by-pass capacitor 71, operate as a biased detector and deliver an output voltage only when the voltage applied to the anode 12 is sufficient to overcome the positive bias at the cathode 10. By suitable adjustment of tap 69, the bias at cathode 10 may be set at the level indicated by broken line 88 in Fig. 6, so that only the positive peak voltages 87 cause current to flow through the diode. Accordingly, only these positive peaks appear at output terminals 11, as illustrated by curve 89.

My invention thus provides a sharp output pulse in response to the frame synchronizing pulses. The output pulses occurring then are much greater in amplitude than those occurring during the line synchronizing pulses. This is due to the coincidence of the positive peaks serially added to the reverse half-cycle of the transient oscillations with the top of the reverse half cycle. Thus my invention provides a circuit which discriminates against all pulses except those of a predetermined time-duration. Such a circuit is eminently suitable for separating frame synchronizing pulses from a mixture of line and frame synchronizing pulses in a television receiver.

While certain specific embodiments have been shown and described, it will, of course, be understood that various modifications may be made without departing from the invention. The appended claims are, therefore, intended to cover any such modifications within the true spirit and scope of the invention.

What I claim as new and desire to secure by Letters Patent of the United States is:

1. A system for discriminating between impulses of different time-durations comprising a pair of electron discharge devices each having an anode, a control electrode and a cathode, means including a differentiating circuit for simultaneously applying a voltage, proportional to the rate of change of said pulses, to both said control electrodes, a transformer having primary and second windings, said secondary winding having a predetermined natural period of oscillation related by a rational factor to the duration of impulses to be selected, said primary winding being connected in the anode-to-cathode circuit of one of said devices, a peak detector circuit, said secondary winding having one of its terminals connected to the anode of the other of said devices and its other terminal connected to the cathode of said other device through said peak detector circuit, said peak detector circuit being negatively biased to produce an output voltage only in response to secondary voltages exceeding a predetermined amplitude.

2. A system for discriminating between impulses of longer and shorter time-durations comprising a pair of electron discharge devices each having an anode, a control electrode and a cathode, a source of operating potential for said devices, a differentiating circuit for simultaneously applying a voltage, proportional to the rate of change of said pulses, to both said control electrodes, a resonant transformer having primary and secondary windings, said secondary winding having a predetermined natural period of oscillation related by a rational factor to the duration of one of said impulses, said primary winding being serially connected in circuit between the anode and cathode of one of said devices a peak detector circuit, said secondary winding having one of its terminals connected to the anode of said other device and the other of its terminals connected to the cathode of said other device through said peak detector circuit, said peak detector circuit being biased to respond only to voltages exceeding a predetermined amplitude.

3. In a television system, a circuit for discriminating between frame synchronizing pulses of a predetermined time-duration and line synchronizing pulses of shorter time-duration, comprising a pair of electron discharge devices each having an anode, a control electrode and a cathode, a source of operating potential for said devices, a differentiating circuit for simultaneously applying a voltage, proportional to the rate of change of said pulses, to both said control electrodes, a transformer having primary and secondary windings, said primary winding being serially connected in circuit between the anode and cathode of one of said devices, said secondary winding having a pair of terminals, means for tuning said windings so that the three-quarter period of the transient oscillation produced therein by said pulses is equal to said predetermined time-duration, a peak detector circuit, said secondary winding having one of its terminals connected to the anode of said other device and the other of its terminals connected to the cathode of said other device through said peak detector circuit, said peak detector circuit being biased to respond only to voltages exceeding a predetermined amplitude.

4. A system for providing a signal in response to pulses of a predetermined time-duration supplied to said system in combination with other pulses of different time-durations, comprising a pair of electron discharge devices each having an anode, a cathode, and a control electrode, a differentiating circuit for simultaneously applying voltages, proportional to the rate of change of said pulses, to both said control electrodes, a resonant transformer having primary and secondary windings, the anode-to-cathode path of one of said devices being connected in circuit with said primary winding so as to produce transient oscillations in said secondary winding in response to said voltages, means for tuning said transformer so that the three-quarter period of said transient oscillations is substantially equal to said predetermined time-duration, the anode-to-cathode path of the other of said devices being connected to apply its output voltage directly to said secondary winding, whereby said oscillations and said output voltage add serially to produce a signal of maximum amplitude in response to said pulses of said predetermined time-duration, and a peak detector circuit connected to said secondary winding, said peak detector responding only to signals of said maximum amplitude.

5. A system for providing an output signal only in response to pulses of a predetermined time-duration which are supplied to said system in sequence with other pulses of different time-durations, comprising first and second electron discharge devices having respective input and output circuits, means comprising a differentiating network for simultaneously impressing input potentials on both said input circuits substantially proportional to the rates of change of said pulses, means biasing said first device to normally non-conductive condition and said second device to normally conductive condition in the absence of input potentials, a transformer having a primary winding energized from said first output circuit and a secondary winding energized from said second output circuit, means for tuning said secondary winding to a natural period of oscillation related by an integral factor to said predetermined time-duration, a detector circuit, and means for impressing on said detector circuit the algebraic sum of pulse voltage developed in said second output circuit and oscillatory voltage developed in said secondary windings, said detector circuit being biased to produce an output signal only when said sum exceeds the maximum value of either of said voltages alone.

ROBERT E. MOE.

REFERENCES CITED

The following references are of record in the file of this patent:

UNITED STATES PATENTS

| Number | Name | Date |
|---|---|---|
| 2,265,988 | Andrieu | Dec. 16, 1941 |
| 2,421,025 | Grieg | May 27, 1947 |
| 2,426,205 | Grieg et al. | Aug. 26, 1947 |
| 2,440,278 | Labin et al. | Apr. 27, 1948 |
| 2,462,061 | Beatty | Feb. 22, 1949 |

FOREIGN PATENTS

| Number | Country | Date |
|---|---|---|
| 378,489 | Italy | Feb. 12, 1940 |

Certificate of Correction

Patent No. 2,529,172 November 7, 1950

ROBERT E. MOE

It is hereby certified that error appears in the printed specification of the above numbered patent requiring correction as follows:

Column 1, lines 12 and 13, for "reflecting" read *deflecting*; column 3, line 70, for "betwen" read *between*; column 6, line 27, for "second" read *secondary*; line 55, after "devices" insert a comma;

and that the said Letters Patent should be read as corrected above, so that the same may conform to the record of the case in the Patent Office.

Signed and sealed this 20th day of March, A. D. 1951.

[SEAL]

THOMAS F. MURPHY,
*Assistant Commissioner of Patents.*